(12) United States Patent
Kelly et al.

(10) Patent No.: US 6,793,866 B2
(45) Date of Patent: Sep. 21, 2004

(54) PROCESS FOR PRODUCING BONDED ACTIVATED CARBON STRUCTURES AND ARTICLES

(75) Inventors: William L. Kelly, Cincinnati, OH (US); Douglas C. McFaddin, Cincinnati, OH (US)

(73) Assignee: Equistar Chemicals, LP, Houston, TX (US)

( * ) Notice: Subject to any disclaimer, the term of this patent is extended or adjusted under 35 U.S.C. 154(b) by 431 days.

(21) Appl. No.: 10/003,833

(22) Filed: Oct. 23, 2001

(65) Prior Publication Data

US 2003/0080473 A1 May 1, 2003

(51) Int. Cl.$^7$ .......................... B29C 35/08; B29C 43/02
(52) U.S. Cl. ............... 264/413; 264/122; 264/DIG. 48; 55/524; 55/DIG. 5; 210/506; 428/408
(58) Field of Search ................................ 264/413, 414, 264/122, DIG. 48; 55/DIG. 5, 524; 210/502.1, 504, 506, 510.1; 502/416.5, 418; 428/407, 408

(56) References Cited

U.S. PATENT DOCUMENTS

| | | | |
|---|---|---|---|
| 3,091,550 A | 5/1963 | Doying | |
| 3,422,049 A | 1/1969 | McClain | |
| 3,432,483 A | 3/1969 | Peoples | |
| 3,474,600 A | 10/1969 | Tobias | |
| 3,721,072 A | 3/1973 | Clapham | |
| 3,746,681 A | 7/1973 | McClain | |
| 4,061,807 A | 12/1977 | Shaler et al. | |
| 4,664,683 A | 5/1987 | Degen et al. | |
| 4,665,050 A | 5/1987 | Degen et al. | |
| 4,753,728 A | 6/1988 | VanderBilt et al. | |
| 5,019,311 A | 5/1991 | Koslow | |
| 5,033,465 A | 7/1991 | Braun et al. | |
| 5,078,132 A | 1/1992 | Braun et al. | |
| 5,147,722 A | 9/1992 | Koslow | |
| 5,331,037 A | 7/1994 | Koslow | |
| 5,928,588 A | * 7/1999 | Chen et al. | 264/113 |
| 6,083,439 A | * 7/2000 | Nastke et al. | 264/122 |
| 6,368,504 B1 | * 4/2002 | Kuennen et al. | 210/315 |

FOREIGN PATENT DOCUMENTS

| | | |
|---|---|---|
| CA | 2159569 | 2/2001 |
| CN | 1277891 | 12/2000 |
| GB | 1 340 503 | 5/1971 |

OTHER PUBLICATIONS

Fathi, Zak, et al.: "Processing and Characterization of a Polymer Matrix Composite Using Variable Frequency Microwave Heating." *Ceram. Trans.*, vol. 59: pp. 441–448.

Bradshaw, S.M., et al.: "Microwave Heating Principles and the Application to the Regeneration of Granular Activated Carbon," *The Journal of the South African Institute of Mining and Metallurgy*, Jul./Aug. 1998; 98(4), pp. 201–210.

Moore, E.H., et al.: "Removal of Polymethyl Methacrylate Binder from Alumina Using Microwave Energy." *Cerm. Eng. Sci. Proc.* (1993), 14(9–10), pp. 848–855.

Moore, E.H., et al.: "Polymethyl Methacrylate Binder Removal from an Alumina Compact: Microwave Versus Conventional Heating." *Mat. Res. Soc. Symp. Proc.* (1992) vol. 269: pp. 341–346.

Menendez, J.A.: "Active Carbons." *Instituto Nacional del Carbon (INCAR), C.S.L.C.*, pp. 820–824. (Oviedo, Spain).

Fu, Da–fang, et al.: "Thermal Treatment of Waste Activated Carbon Using Microwave Heating." *Proc. Int Conf. Solid Waste Technol. Manage.* (1997) 13th (vol. 1), Paper 5D/3, 1–3.

Menendez, J.A.: "Modification of the Surface Chemistry of Active Carbons by Means of Microwave–induced Treatments." *Instituto del Carbon (INCAR) C.S.I.C.* (1999), 37(7), 1115–1121. (Oviedo, Spain).

\* cited by examiner

*Primary Examiner*—Mary Lynn Theisen
(74) *Attorney, Agent, or Firm*—William A. Heidrich; Gerald A. Baracka

(57) ABSTRACT

An improved process for producing bonded activated carbon structures utilizing microwave radiation is provided. The structures are produced by exposing a particulate mixture comprised of activated carbon particles and polyolefin resin binder particles in a microwave transparent mold to increase the temperature of the activated carbon particles 3 to 30° C. above the crystalline melting point of the polyolefin resin binder and thereafter compressing the mixture to increase contact between the particles and lowering the temperature of the particulate mixture below the melting point of the polyolefin while maintaining point bond formation conditions. The bonded structures may be separated from the container and used as such or the bonded structure and container in which it is formed may be retained and used as a unit.

15 Claims, No Drawings

PROCESS FOR PRODUCING BONDED ACTIVATED CARBON STRUCTURES AND ARTICLES

BACKGROUND OF THE INVENTION

1. Field of the Invention

The present invention relates to an improved process for producing bonded activated carbon structures wherein the activated carbon particles are bonded utilizing polyolefin resin microfine powders. The process utilizes microwave radiation to heat a mixture of the activated carbon and polyolefin resin binder in a microwave transparent container. The heated mixture is compacted and cooled to maximize point bond formation within the structure.

2. Description of the Prior Art

Bonded adsorbent structures are known and have been used for numerous industrial applications. Bonded adsorbent structures wherein the adsorbent particles, including activated carbon, are coated with a polymeric binder are disclosed in U.S. Pat. No. 3,091,550. Bonded carbon articles, including shaped pellets and larger articles produced therefrom, are also disclosed in U.S. Pat. No. 3,474,600.

U.S. Pat. No. 3,721,072 discloses a filter device having granulated activated carbon bonded into a unitary mass with a bonding agent which occupies no more than one-half the available space between the carbon granules.

Numerous other references, including U.S. Pat. Nos. 4,061,807; 4,664,683; 4,665,050; 4,753,728; 5,019,311; 5,033,465; 5,078,132; 5,147,722; and 5,331,037, relate to various aspects of bonding individual adsorbent particles to one another using adherent binders.

The technique of bonding contiguous adsorbent particles through a binder particle "bridge" to create a unitary self-supporting structure is referred to as point-bonding. While numerous processes involving the application of heat, pressure and, in some cases, shear have been developed for the production of point-bonded articles, there is a continuing need by the industry for improved manufacturing procedures. For example, in the manufacture of absorbent canisters, such as in water filters or automotive evaporative emission canisters, whereby the activated carbon particles are commonly employed to adsorb organic molecules, hydrocarbons or other vapors. Since most emission canisters are designed with partition plates and similar structural components to lengthen the path of the vapors as they pass through that activated carbon, it is impractical utilizing heretofore known technology to manufacture canisters wherein the activated carbon adsorbent bed is a unitary bonded structure. As a result, most canisters utilize a loose bed of the adsorbent particles which are prone to channeling and the production of fines, both of which reduce vapor adsorption efficiency.

The effects of microwaves on the surface properties of active carbon in terms of acidity or basic functionally changes have been studied. Also, microwave energy has been used for drying and regeneration of activated carbons and other powder materials. In still other instances polymer composites or mixtures have been formed or heated with microwave energy. For example, in British Patent Specification 1340503, compacted sintered mixtures of polytetroflouroethylene powder and carbon powder, e.g., powdered graphite or coke flour, have been subjected to microwave radiation to form cohesive products. The discs were placed in a 240 MHz microwave field and heated for 10 minutes. Moore, et al., in *Ceram. Eng. Sci. Proc.* (1993), 14(9–10), 848–855 report the use of microwave energy to remove polymethyl methacrylate binder from alumina compacts to produce very clean ceramic substrates. The regeneration of activated carbon to remove volatile nonpolar organic substances and foulants adsorbed in gold recovery processes have also been respectively disclosed by Ning, et al., Chinese Patent No. 1277891 and Bradshaw, et al., in *J.S. Afr. Inst. Min. Metall.* (1998), 98(4), 201–210.

With the improved process of the invention, it is now possible to rapidly and continuously produce bonded activated carbon adsorbent structures. Furthermore, it is possible to produce these structures in a variety of configurations and, if desired, in a container or housing which becomes part of the final structure. These and other advantages will be apparent from the description of the invention which follows.

SUMMARY OF THE INVENTION

The invention relates to a process for producing bonded activated carbon structures. The improved process comprises (a) preparing a substantially homogeneous particulate mixture by combining 5 to 30 weight percent, based on the total weight of the mixture, of a polyolefin resin powder having an average particle size between 5 and 125 microns and 70 to 95 weight percent, based on the total weight of the mixture of a particulate activated carbon; (b) introducing the particulate mixture prepared in (a) into a microwave transparent container; (c) exposing the container containing the particulate mixture to microwave radiation to increase the temperature of the activated carbon particles 3 to 30° C. above the crystalline melting point of the polyolefin resin; (d) compacting the particulate mixture to increase contact between the particles; and (e) lowering the temperature of the particulate mixture below the melting point of the polyolefin while maintaining point bond formation conditions.

In one aspect of the invention the bonded activated carbon structure is utilized with the container in which it is formed. The bonded adsorbent bed and container are the finished article or a component of the finished article. In another embodiment the bonded activated carbon structure is separated and removed from the container in which it is formed. In this latter case the container simply functions as a mold.

Especially useful bonded structures are produced utilizing ethylene homopolymer, propylene homopolymer, and ethylene or propylene copolymer binder powders, particularly microfine polyethylene and ethylene-propylene copolymers wherein the particles are spheroidal or substantially spheroidal in shape. It is particularly advantageous when the particulate mixture is formed with binders of the above types and granular activated carbon having an average particle size of 5 to 300 mesh. Preferred particulate mixtures contain 75 to 92.5 weight percent of the activated carbon and 7.5 to 25 weight percent of the polyolefin resin binder.

The activated carbon particles are bonded in fixed relationship to each other by the polyolefin resin binder. This is accomplished without significantly reducing the hydrocarbon adsorption capacity of the activated carbon particles and without substantially reducing the vapor permeability of the bonded mass. As a result of each particle being fixed in position relative to adjacent particles, movement of the particles can result in the formation of fines and compaction/rearrangement of the adsorbent bed, is eliminated or minimized. Other advantages of the inventive process include adaptability to rapid, continuous operation and the ability to produce articles of varying shapes and articles wherein the container in which the bonded adsorbent structure is formed is a component part of the finished article. Furthermore, structural components which are part of or positioned within the container, such as partitioning plates or the like, may be molded within the unitary adsorbent bed.

There are also provided articles of manufacture produced by the improved process of the invention. Articles produced by the process of the invention consist of a unitary porous adsorbent structure within a microwave transparent containment means.

DETAILED DESCRIPTION

In accordance with the present invention, a mixture of activated carbon particles and polyolefin resin binder particles are introduced into a microwave transparent or substantially microwave transparent container and exposed to a microwave radiation source to heat the activated carbon above the crystalline melting point of the polyolefin. The heated mixture is then compacted, such as by applying moderate pressure, to increase particle contact. While in this compacted state, the temperature of the mixture is lowered to below the melt point of the polyolefin thereby forming point bonds to fix the position by the activated carbon particles relative to each other and provide a unitary porous adsorbent bed within the container. Details of the essential features of the invention are described below.

The Particulate Mixture

Activated carbons useful for the present invention are any of the predominantly amorphous products characterized by having a large internal surface area and pore volume. Products produced by either thermal or chemical treatment, i.e., activation of the precursor material, can be used. The activated carbon can be used as such or, if desired, composite materials wherein the activated carbon is combined with a binder material, such as clays, can be employed. While powders may be used for the process, it is generally preferred to use granules, pellets or other shaped products such as saddles, rods, or the like. Choice of the particular type of activated carbon used will depend upon the intended application, bed design and process requirements. Use of activated carbon/clay composites may be advantageous. Composites of this type are commonly used for the production of shaped activated carbon products. For example, cylindrical pellets and rods are typically manufactured by extruding activated carbon/clay composite materials.

Granular activated carbon products useful for the invention will typically have an average particle size of 5 to 500 mesh and, more preferably from 25 to 325 mesh. Extruded pellets or rods can have diameters ranging from 1 to 8 mm and, more preferably, from 2 to 5 mm. Representative granular activated carbons which can be used for the process are NUCHAR® WV-A 900, WV-A 1100, WV-A 1500 and WV-B. Representative pelletized products include NUCHAR® BAX-1100, BAX-1500, BX-7530 and BX-7540.

Although activated carbon does not have a dipole moment, heating occurs in the carbon particles exposed to microwave energy. This heating is generally believed to be due to "resistive" heating. In carbon samples it has been observed that electric fields generated by microwaves cause electrons to flow in the material. Being relatively poor conductors, however, the resistance to flow generates heat. Moisture associated with the activated carbon particles may also contribute to the heating. The dipole of water molecules interacts with microwave electric fields and it has been reported that adsorbed water on and within activated carbon materials retains its liquid character and thus adsorbs microwaves.

Present with the above-described activated carbon is a microfine polyolefin resin powder which serves as the binder and results in the formation of point bonds within the resulting unitary adsorbent bed. Polyolefins useful for the invention include ethylene homopolymers or copolymers and propylene homopolymers or copolymers. While other thermoplastic resins can be employed, such as polystyrenes, polyamides, polycarbonates, polyurethanes, vinyl resins and the like, homopolymers of ethylene and copolymers of ethylene with other olefinic monomers, such as $C_{3-8}$ α-olefins, vinyl carboxylates and alkyl acrylates and methacrylates, are preferred. These resins have crystalline melting points within the preferred operating parameters of the process and melt viscosities of these resins are favorable for forming point bonds at discrete regions on the activated carbon particles without significant blinding of the pores. Furthermore, powders having the requisite particle size are readily produced with these polymers.

Especially useful resins are ethylene homopolymers and copolymers of ethylene with propylene, butene-1, hexene-1, octene-1, vinyl acetate, methyl acrylate, ethyl acrylate, and n-butyl acrylate. Polymers having crystalline melting points from 50 to 200° C. and, more preferably, within the range 90 to 170° C. and melt indexes from fractional to 1000 g/10 min and, more preferably, from 1 to 200 g/10 min. are useful for the process. For reasons which will be more fully apparent hereafter, nonpolar polyolefins, such as polyethylene, are especially useful binders for the present process.

The polyolefin resin binders are employed in powder form. Useful powders have an average particle size between 5 and 125 microns and, more preferably, between 7 and 60 microns. In an especially useful embodiment of the invention, the polyolefin resin powders, and especially nonpolar polyolefin powders, are microfine powders which are spheroidal or substantially spheroidal in shape produced using dispersion procedures.

Microfine powders produced directly from polymerization processes, as well as those formed through grinding, sieving, precipitation or dispersion methods will all work as a binder in this process. Microfine powders produced using dispersion processes have substantially narrower particle size distributions than powders produced by precipitation, grinding or milling. Microfine polyolefin powders are conveniently produced using the dispersion techniques described in U.S. Pat. Nos. 3,422,049, 3,432,483 and 3,746,681, details of which are incorporated herein by reference. In these powder-forming dispersion processes, the polyolefin is charged to the reactor with a polar liquid medium and nonionic surfactant and a dispersion is formed in accordance with conventional dispersing procedures described in the art.

The dispersing apparatus may be any device capable of delivering sufficient shearing action to the mixture at elevated temperature and pressure. Conventional propeller stirrers designed to impart high shear can be used for this purpose. The vessel may also be equipped with baffles to assist in dispersing the copolymer. Particle size and particle size distribution will vary depending on the shearing action which, in turn, is related to the stirrer design and rate of stirring. Agitation rates can vary over wide limits.

The dispersion process is typically carried out in a vessel which enables the powder-forming process to be conducted at elevated temperature and pressure. In the usual batch process, all of the ingredients are charged to the vessel and the mixture is heated to a temperature above the melt point of the copolymer. While the temperature will vary depending on the specific polymer being used, it will typically range from about 175° C. to about 250° C. Since the fluidity of the dispersion is temperature dependent, it may be useful to carry out the process at temperatures substantially above the melting point of the polymeric blend to facilitate formation of the dispersion; however, the temperature should not exceed the thermal degradation temperature of the polymer.

Stirring is commenced after the desired temperature is reached and continued until a dispersion of the desired droplet size is produced. This will vary depending on the particular polymer being used, temperature, amount and type of surfactant, and other process variables.

A polar liquid medium which is not a solvent for the polyolefin is employed as the dispersant for the formation of these microfine powder supports. These polar media are hydroxylic compounds and can include water, alcohols, polyols and mixtures thereof. It is particularly advantageous to use water as the dispersing medium or a liquid medium where water is the major component.

The pressure of the process is not critical so long as a liquid phase is maintained. In general, the pressure can range from about 1 up to about 250 atmospheres. The process can be conducted at autogenous pressure or the pressure can be adjusted to exceed the vapor pressure of the liquid medium at the operating temperature.

To form acceptable dispersions, one or more dispersing agents are necessarily employed. Useful dispersing agents are nonionic surfactants which are block copolymers of ethylene oxide and propylene oxide. Preferably, these nonionic surfactants are water-soluble block copolymers of ethylene oxide and propylene oxide and have molecular weights greater than about 3500. Most will contain a major portion by weight of ethylene oxide and are obtained by polymerizing ethylene oxide onto preformed polyoxypropylene segments. The amount of nonionic surfactant employed can range from about 4 to about 50 percent, based on the weight of the copolymer.

Useful nonionic surface active agents of the above type are manufactured and sold by BASF Corporation, Chemicals Division under the trademark Pluronic. These products are obtained by polymerizing ethylene oxide onto the ends of a preformed polyoxypropylic base. A wide variety of products of this type wherein the molecular weight of the polyoxypropylene base and the polyoxyethylene segments is varied are available. It is also possible to employ products sold under the trademark Tetronic which are prepared by building propylene oxide block copolymer chains onto an ethylenediamine nucleus and then polymerizing with ethylene oxide.

The activated carbon and polyolefin binder resin are combined to form a homogeneous mixture, i.e., a mixture wherein the smaller binder powder particles are substantially uniformly mixed with the larger activated carbon particles which comprise the bulk of the mixture. Mixing may be accomplished by conventional means for mixing dry components, such as with a rotary blender or tumbling device. High-speed, high-shear mixing should be avoided in order to preserve the integrity of the frangible activated carbon species. The mixture is broadly comprised of 70 to 95 weight percent activated carbon and 5 to 30 weight percent polyolefin resin binder. Highly useful products are produced in accordance with the process of the invention using mixtures containing 75 to 92.5 weight percent activated carbon and 7.5 to 25 weight percent binder resin. Weight percentages referred to above are based on the weight of the total mixture.

The Microwave Transparent Container

In the next step of the operation, the particulate mixture is transferred to a microwave transparent container. The container and its contents will subsequently be exposed to microwave radiation to heat the activated carbon above the crystalline melting point of the polyolefin resin so that point bonds can be formed between the activated charcoal particles. Care should be used to maintain homogeneity, i.e., uniformity, of the mix during transfer. It is possible in some instances to mix the activated carbon and binder powder directly in the container, provided a homogeneous mix can be obtained.

The containers are constructed of materials which are microwave transparent or substantially microwave transparent, i.e., materials which do not interact with the microwave electric field to a significant extent. Such materials can be nonpolar or posses low polarity such that they are generally recognized to be insulating or nonconducting. Additionally, the materials from which the containers or molds are constructed should be substantially free of microwave-receptive materials such as polar compounds (e.g., water), ionic compounds or conductive compounds. Containers produced from nonconducting thermoplastics and glass are highly useful for the invention. Polyolefins and polyamides are especially useful container materials. Polyethylene and polypropylene are particularly useful polyolefins. Nylon 6, nylon 64, nylon 6,6, nylon 610, nylon 612, nylon 11 and nylon 12 are particularly useful polyamides. The particular nonconducting polymer used will be selected to a large extent based on whether it will simply serve as the mold to produce a free-standing bonded structure or whether it will be part of the finished article. In the latter case, the structural design of the container and intended application of the finished particle will also play a large role in the selection of the resin. For example, for automotive hydrocarbon emission canisters, a resin capable of being readily molded to the appropriate shape and having good thermal and chemical resistance would be selected.

When free-standing, bonded adsorbent articles are produced, the point bonded adsorbent is removed from the container in which it was formed after compaction and cooling below the melting point of the binder. In this case the container simply serves as a mold. Such procedures may be utilized for the production of replacement cartridges such as might be employed for water filtration or the like. This is most readily accomplished utilizing a container having smooth interior surfaces to facilitate separation of the bonded activated carbon structure from the container, i.e., mold. The material used for container construction, whether thermoplastic or other, should be one which exhibits little adhesion for the binder. Adhesion of the adsorbent bed to the walls of the container is, however, typically not a problem even if a polyolefin container is employed, since heating is concentrated within the particulate mass and there is minimal heat transfer to the container due to rapidity with which the process can be conducted. This is a marked improvement over heretofore practiced procedures heated by conventional means, such as in an oven, where the container and its contents are all at essentially the same temperature. Such processes which rely on heat transfer to achieve the desired temperature of the material within the mold, generally require prolonged heating and the temperature of the container is at least as high, and in most instances, higher than the temperature of the particulate mass within the container.

One of the advantages of the process of the invention is the ability to form a bonded adsorbent bed in a container which is part of the finished article. Containers utilized for constructions of this type may differ significantly from containers used solely as molds; however, in general, containers may be of rigid, semi-rigid or flexible construction. If the latter, the bonded activated carbon adsorbent bed will impart structural integrity to the finished article. The container may be constructed from sheet material, film, screen or fabric, which can be either woven or nonwoven. Some constructions may combine one or more of these material forms. Shape and size of the containers can vary widely and will depend on the article being produced. The only requirement is that the container be microwave transparent, or substantially so, and capable of supporting the particulate mixture in the desired configuration during the subsequent microwave heating, compaction and cool down. Thickness of the container walls can vary widely and will depend on the function of the container. When the container functions as a mold, the container walls are typically thicker—up to an inch or more in some instances depending on the material used for mold construction. Thinner-walled containers are generally employed where the container is to be part of the finished article. In this case economics dictate the least possible material which meets the requirements of the application be used for container construction.

The many advantages of the present processes and ability to adapt the process to a variety of improved manufacturing operations are apparent to those skilled in the art of this technology. It is envisioned that improved continuous manufacture of bonded absorbent articles, with or separated from the structure used to contain the particulate mixture, would be facilitated by the process. For example, for the production of cylindrical bonded activated carbon articles, the particulate mixture may be continuously loaded into a thermoplastic film tube as it is formed and the loaded tube exposed to microwave radiation to bond the adsorbent particles within. Compaction of the particulate mass as required by the process could be accomplished by vibratory or mechanical means or, if the thermoplastic containment film is a heat shrinkable material, by thermal treatment. After cool down, the bonded activated carbon cylinder would be cut into appropriate lengths and, if desired, the film surrounding the bonded activated carbon cylinder could be removed. Similar procedures are possible for the production of articles of different shapes or where a fabric is used as the containment material.

In one highly useful embodiment, thermoplastic articles comprising a unitary porous activated carbon structure within a functional containment means are provided. Such constructions can include, for example, in-line filtering devices, hydrocarbon emission canisters and the like. These articles will typically have inlet and outlet openings and, depending on the application and location of the inlet and outlet ports, one or more partitions or baffles to direct the liquid or vapors within the activated carbon adsorbent bed to maximize the path of travel and achieve optimum adsorption efficiency. The inlet and outlet ports may be at opposite ends of the article, as with elongated cylindrical filters, or at the same end provided suitable partitions/baffles are incorporated for directing flow within the adsorbent bed. Additional ports, such as air intake ports, may also be incorporated. Depending on the location of the ports, screens may be necessary within the container to retain the particulate mixture during transfer and before point bonding.

Alternatively, a grid having perforations suitably sized to retain the activated carbon particles may be injection molded into any openings located at the bottom and sides of the container.

In one method for producing useful articles in accordance with the invention, the top of the container is open. While this is the conventional practice where the bonded adsorbent is to be removed from the mold, it is also advantageous for the manufacture of constructions where the container used for molding is part of the finished product. This facilitates introduction of the particulate mixture and uniform distribution of the mixture around any structural features within the container, e.g., partitions, baffles, etc. It also facilitates compaction since the top of the particulate mixture is exposed and readily accessible for application of pressure by hydraulic means, inflatable bladder or the like. Upon completion of the point bonding operation, a top may be joined to the structure containing the bonded activated carbon so that the adsorbent bed is enclosed within the unitary thermoplastic construction. Joining the two sections may be accomplished using suitable adhesives, linear welding or the like.

It is not, however, necessary to have the top of the container removed in order to conduct the process. Containers may be molded as a single unit and the particulate mixture introduced through an open port and disposed within the desired volume of the container. This procedure requires the interior of the molded container have little, if any, interior structure to interfere with the ability of the activated carbon/binder mixture to be distributed throughout the interior cavity. Compaction in this situation can be accomplished by means of a bladder capable of being introduced, when deflated, through one of the ports. After insertion into the container, the bladder would be inflated to engage the particulate mixture and provide the desired degree of compaction for effective point bond formation.

Forming the Point Bonds

The microwave transparent container and particulate mixture contained therein are exposed to a microwave radiation source to increase the temperature of the activated carbon 3 to 30° C. above the melting point of the polyolefin resin binder. This amount of temperature increase is sufficient upon compression to form point bonds in those discrete regions where the binder powder contacts the activated carbon particles but without increasing the melt viscosity of the polyolefin to such an extent to cause significant flow and blinding of the activated carbon pores. Furthermore, by using microwave radiation the heat is generated within the particulate mixture. This makes it possible to significantly reduce the heatup cycle time and also provides more uniform temperature throughout the particulate mass, i.e., avoidance of localized "hot spots," as commonly occurs using conventional heat transfer technology.

Conventional microwave sources capable of operating at frequencies within the microwave portion of the spectrum are employed for the process. While the frequency bands at 915 and 2450 $MH_z$ are the most developed and widely used bands for microwave power applications, higher and lower frequency power sources can be employed for the process.

The time required for the heat up cycle, i.e., for the activated carbon particles to reach the desired temperature, varies depending on the particular microwave power source used, the form and type of activated carbon, the moisture content of the activated carbon, the thickness of the adsorbent bed and other factors. An optimum heat up cycle time will be developed for each application's varying parameters. In general, however, exposure times can range from a few seconds up to 30 minutes or more. For most applications, it is desirable to use exposure times from about 10 seconds up to about 4 minutes.

When the desired temperature of the activated carbon within the particulate mass is achieved, the mixture is compacted to increase contact between the particles within the mixture. This is accomplished by applying moderate compressive pressure to the adsorbent bed—either by applying pressure directly to the bed within the container, where the container has suitable rigidity or, where the container has suitable flexibility, by applying pressure to the container. It is anticipated that vibratory methods may also be employed to achieve the desired degree of compaction, particularly if used in conjunction with other pressure generating means. The particular method used will depend on the structure of the container.

Compaction/compression of the carbon/binder mixture may be commenced before microwave heating has terminated provided, of course, the compaction means used is nonconducting. It is more customary, however, that compression of the heated sample be started after removal of the container and its contents from the microwave energy. Compaction times can vary from a few seconds up to an hour or more depending on the pressure being applied, the size and configuration of the adsorbent bed structure, the degree to which the activated carbon was heated and any number of other variables. As a general rule, length of time for the compacting step will be as short as possible and not less than 10 seconds or greater than 30 minutes.

The method of applying pressure directly to the particulate mixture is particularly useful with containers where the top of the bed is fully or substantially fully exposed. In these cases, pressure may be applied over the entire exposed surface area of the adsorbent bed by hydraulic means, such as by use of a piston, an inflatable bladder or by any other means known for the application of pressure. This method is commonly used with two-piece rigid or semi-rigid containers where the particulate mixture is loaded into the bottom section and, after the bonded adsorbent bed is formed, the top and bottom sections are joined.

Compaction may be achieved by applying pressure directly to a surface of the particulate mixture in one-piece containers provided these containers have an opening of suitable size for insertion of an inflatable bladder. Once inserted into the container, the bladder is inflated and contacts the surface of the particulate mass within the container to provide the compaction necessary for point bond formation.

The second method where compaction is achieved by applying pressure to the container walls is primarily useful where the containment means is constructed from flexible or semi-flexible material.

To effect the desired degree of point bond formation the compaction operation should be capable of applying a pressure of from about 2.5 psi up to about 40 psi. Most generally, the compactive/compressive force will be from about 3 psi to about 30 psi. Compaction may commence at any point during the heat up cycle but, most preferably, is carried out after microwave heating has been completed. The only requirement is that the compactive force necessary for point bond formation within the particulate mixture be maintained while the temperature of the particulate mixture is decreased to below the crystalline melting point of the polyolefin binder resin. Cooling to lower the temperature of the particulate mass below the melt point of the binder resin and "set" the point bonds can be accomplished under ambient conditions or, if desired, supplemental external cooling means, such as use of a cooling jacket, can be used.

By combining the use of microwave with activated carbon particles, which are heated by microwaves, and polyolefin binders, which are essentially unaffected by the microwaves, and by the use of microwave transparent containers to hold the particulate mixture of carbon and binder during microwave heating, the unique process of the invention overcomes many of the problems associated with traditional methods of forming bonded adsorbent structures.

In traditional systems where adsorbents such as carbon and a binder like a polyolefin powder are used to form a solid block, both materials are heated during the extrusion or compression stage. In such systems all of the polymeric binder is melted and, under the conditions of shear or molding, the melted binder can "smear" over the carbon surface causing "blinding" of the carbon surface and resulting in a substantial decrease in effectiveness of the resulting bonded adsorbent structure. However, since only those binder particles which come in contact with two or more adjacent activated carbon particles are important in forming the point bonds, it is highly advantageous with the instant process, to heat only the carbon particles with microwave and then compress the sample so that binder particles in contact with the activated carbon melt to bond adjacent carbon particles together. Binder particles only in contact with other binder particles, in contact with only one other carbon particle or otherwise disposed within the porous structure of the matrix remain essentially in tact in their spherical form thus minimizing blinding of the activated carbon. Polyolefin binder not in contact with the heated particulate carbon does not undergo significant melt flow and therefore does not occlude the active sites.

Numerous advantages are obtained with the present process. The temperature of the activated carbon can be easily controlled by the amount of microwave energy (power and time) put into the system. This facilitates the use of different polymeric binder systems, including both lower and higher melting polymers, which enables the processor to vary the physical properties of the finished bonded activated carbon structure. It also makes it possible to vary the porosity and physical integrity (strength) of the bonded structures by varying the binder type and particle size, the activated carbon type and particle size, the compression energy (time and pressure) and energy input from the microwave source. Additionally, because the mixture is heated in situ, low cost containers (molds or canisters) can be used and it is possible to form customized shapes which are more intricate than heretofore possible.

Numerous variations and alternative forms of the invention are possible and the following examples illustrate just a few of the many possible embodiments. These examples are not intended to limit the invention.

In the examples, 50 grams of the dry powder blends were weighed into a hollow nylon cyclinder. The dimensions of the cylinder were h=3.75", OD=2.63", ID=1.88". Microwave energy was supplied using a microwave oven at a frequency of 2450 $MH_2$ rated output of 0.92 kW. The microwave was cycled (10 seconds on and 10 seconds off) for the designated time. During each 10 second off interval, the sample was rotated approximately 60°. When the heating cycle was completed, the mold containing the heated particulate mixture was removed from the microwave oven and pressure applied to the mixture while allowing the mold and its contents to cool under ambient conditions for periods of time ranging up to 10 minutes. The polyolefin powder used in these examples was an LDPE powder having a peak melting point of approximately 110° C., density of 0.923 g/cm$^3$ (ASTM-D1505) and melt index of approximately 5 g/10 min at standard conditions (190° C., 2160 g, ASTM-D1238). Activated carbons used were a granular form from Westvaco (WV-A 1100) (approximately 8.8% moisture) and a powder form from Calgon Carbon Corp. (TOG 80×325) (approximately 3.3% moisture). Moisture contents were obtained using a coulometric titration method measured on the moisture released after heating at 245° C. Compositional details, processing conditions and characterizations of the bonded activated carbon cyclindrical blocks produced are provided in the table.

The versatility of the process is apparent from data presented for samples A–F. All of the bonded structures formed had good physical properties and were generally judged to be acceptable for commercial applications. The data demonstrate the ability to vary the type and amount of activated carbon used and to vary the conditions used to heat and compact the samples. Bonded activated carbon structures were produced using both granular and powdered carbon and by exposing the samples to microwave heating for periods of time ranging from 1 to 2.5 minutes. Useful products were produced using a range of pressures and times for the compression/compaction step.

Results of samples G–J are presented to demonstrate combinations of conditions which did not produce bonded structures considered to have acceptable properties. For the comparative samples, it should be noted that it might be possible to obtain acceptable structures by changing one or more of the process conditions. For example, while sample H containing 10% binder with the granular carbon did not form an acceptable structure under the heating and compaction conditions selected, an acceptable structure was produced (see Sample F) under the same heating and compaction conditions and using the same binder and binder level by using a different activated carbon. Also, it will be observed that by increasing the time of compaction with the particulate mixture H, it was possible to somewhat improve the properties of the resulting structure (compare Samples H and I). It is anticipated that with further optimization of the process conditions, i.e., by increasing microwave heating time and/or increasing time and/or pressure during compaction, that acceptable results could be achieved.

We claim:

1. In a process for producing activated carbon adsorbant structures using resin binders to bond the activated charcoal particles, the improvement comprising:
   (a) preparing a substantially homogeneous particulate mixture by combining 5 to 30 weight percent polyolefin resin powder having an average particle size between 5 and 125 microns and 70 to 95 weight percent particulate activated carbon;
   (b) introducing the particulate mixture prepared in step (a) into a microwave transparent container;
   (c) exposing the container containing the particulate mixture to microwave radiation to increase the temperature of the activated carbon 3 to 30° C. above the crystalline melting point of the polyolefin resin;
   (d) compacting the particulate mixture to increase contact between the particles; and;
   (e) lowering the temperature of the particulate mixture below the melting point of the polyolefin while maintaining point bond formation conditions.

2. The process of claim 1 wherein the polyolefin resin is an ethylene homopolymer or copolymer.

3. The process of claim 2 wherein the polyolefin resin has a crystalline melting point from 50 to 200° C. and melt index from fractional to 1000 g/10 min.

4. The process of claim 3 wherein the polyolefin resin is a nonpolar polyolefin.

5. The process of claim 3 wherein the polyolefin resin is polyethylene.

6. The process of claim 3 wherein the polyolefin resin is a copolymer of ethylene and propylene.

7. The process of claim 3 wherein the polyolefin resin has a crystalline melting point from 90 to 170° C. and melt index from 1 to 200 g/10 mm.

8. The process of claim 1 wherein the average particle size of the polyolefin powder is 7 to 60 microns.

9. The process of claim 1 wherein the polyolefin powder is a microfine polyolefin powder wherein the particles are spheroidal or substantially spheroidal in shape.

10. The process of claim 1 wherein the activated carbon is a granular activated carbon having an average particle size of 5 to 500 mesh.

11. The process of claim 1 wherein the particulate mixture comprises 75 to 92.5 weight percent activated carbon and 7.5 to 25 weight percent microfine polyethylene powder.

12. The process of claim 1 comprising the additional step of separating and removing the bonded structure produced in step (e) from the microwave transparent container.

| Sample | Activated Carbon/ Wt. % | Wt. % Polyethylene Powder | Microwave Cycle Time (minutes) | Compaction Conditions Pressure (psi) | Time (minutes) | Condition of Bonded Structure |
| --- | --- | --- | --- | --- | --- | --- |
| A | Granular/80 | 20 | 2 | 6 | 8 | Good physical properties |
| B | Granular/80 | 20 | 2.5 | 10 | 1 | Good physical properties |
| C | Granular/80 | 20 | 1.3 | 5 | 1 | Good physical properties |
| D | Granular/80 | 20 | 1 | 10 | 0.3 | Good physical properties |
| E | Powder/80 | 20 | 2.5 | 20 | 2 | Good physical properties |
| F | Powder/90 | 10 | 2.5 | 20 | 2 | Good physical properties |
| G | Granular/80 | 20 | 0.7 | 10 | 0.15 | Outside cylinder was acceptable but interior was not completely bonded; overall quality of the structure was poor. |
| H | Granular/90 | 10 | 2.5 | 20 | 2 | Poor physical properties; broke when handled. |
| I | Granular/90 | 10 | 2.5 | 20 | 10 | Poor physical properties; but not as fragile as H. |
| J | Granular/92 | 8 | 1 | 3.4 | 10 | Poor Physical properties; cracked when handled. |

13. The process of claim 1 wherein the microwave transparent container is constructed from a polyolefin or polyamide.

14. The process of claim 1 wherein the container and particulate mixture are exposed to microwave radiation for a period of 10 seconds up to 4 minutes.

15. The process of claim 1 wherein a pressure of from 2.5 to 40 psi is applied for a period of from 10 seconds to 30 minutes to compact the particulate mixture.

* * * * *